US012783734B2

(12) United States Patent
Armleder

(10) Patent No.: US 12,783,734 B2
(45) Date of Patent: Nov. 3, 2026

(54) METHODS AND APPARATUS FOR DIGITAL SIGNATURES

(71) Applicant: Sebastien Armleder, Carouge (CH)

(72) Inventor: Sebastien Armleder, Carouge (CH)

(73) Assignee: Sebastien Armleder, Carouge (CH)

( * ) Notice: Subject to any disclaimer, the term of this patent is extended or adjusted under 35 U.S.C. 154(b) by 772 days.

(21) Appl. No.: 17/903,818

(22) Filed: Sep. 6, 2022

(65) Prior Publication Data

US 2023/0074886 A1 Mar. 9, 2023

(30) Foreign Application Priority Data

Sep. 8, 2021 (EP) .................................... 21195614
Jan. 5, 2022 (EP) .................................... 22150341

(51) Int. Cl.
*G06F 21/64* (2013.01)

(52) U.S. Cl.
CPC .................................... *G06F 21/64* (2013.01)

(58) Field of Classification Search
CPC ..... G06F 21/64; H04L 9/0825; H04L 9/0894; H04L 9/50; H04L 63/0853; H04L 9/3234
See application file for complete search history.

(56) References Cited

U.S. PATENT DOCUMENTS 6,662,299 B1 12/2003 Price
6,810,122 B1 10/2004 Miyazaki et al.
7,181,017 B1 2/2007 Nagel et al.
7,421,080 B2 9/2008 Matsumura et al.
7,797,543 B1 9/2010 Campbell et al.
8,566,247 B1 10/2013 Nagel et al.
9,331,984 B2 5/2016 Matsuo
(Continued)

FOREIGN PATENT DOCUMENTS

CA 2664322 A1 5/2008
EP 0880254 A2 11/1998
(Continued)

OTHER PUBLICATIONS

"NXP Secure Microcontroller Smart MX 3 P71D321", Retrieved from the internet URL: [https://www.nxp.com/docs/en/fact-sheet/P71D321.pdf], Retrieved Aug. 30, 2022.

*Primary Examiner* — Jeffrey C Pwu
*Assistant Examiner* — Mayasa A. Shaawat
(74) *Attorney, Agent, or Firm* — ALG Intellectual Property, LLC

(57) ABSTRACT

A data processing apparatus includes a secure portion, wherein the secure portion includes a private key, an unencrypted private certificate key, and a seed generated based on a private certificate key, wherein the private key, the unencrypted private certificate key, and the seed are non-extractable from the secure portion. A method that uses the data processing apparatus includes the secure portion receiving a signing request; in the secure portion, generating a signature signed with a private key derived from the seed and signing the signature with the unencrypted private certificate key and thus generating a signature signed with the unencrypted private certificate key; and outputting the signature signed with the private key derived from the seed and the signature signed with the unencrypted private certificate key.

11 Claims, 11 Drawing Sheets

(56) References Cited

U.S. PATENT DOCUMENTS

| | | | |
|---|---|---|---|
| 9,454,677 B1 | 9/2016 | Sinclair et al. | |
| 2001/0037453 A1 | 11/2001 | Mitty et al. | |
| 2002/0141575 A1* | 10/2002 | Hird | G06F 21/62 726/28 |
| 2003/0014632 A1 | 1/2003 | Vanstone | |
| 2005/0177504 A1 | 8/2005 | Crosson | |
| 2005/0177521 A1 | 8/2005 | Crosson | |
| 2006/0233374 A1* | 10/2006 | Adams | G07F 7/084 380/268 |
| 2007/0006322 A1* | 1/2007 | Karimzadeh | G06F 21/6227 726/28 |
| 2008/0095375 A1 | 4/2008 | Tateoka et al. | |
| 2008/0263363 A1 | 10/2008 | Jueneman et al. | |
| 2009/0019548 A1 | 1/2009 | Reid | |
| 2010/0313032 A1 | 12/2010 | Oswalt | |
| 2011/0247057 A1 | 10/2011 | Michael et al. | |
| 2013/0046973 A1 | 2/2013 | Resch et al. | |
| 2013/0119130 A1 | 5/2013 | Braams | |
| 2015/0363786 A1 | 12/2015 | Kolupaev et al. | |
| 2017/0346804 A1 | 11/2017 | Beecham | |
| 2018/0262341 A1 | 9/2018 | Cheng et al. | |
| 2019/0019144 A1 | 1/2019 | Gillen | |
| 2019/0052461 A1 | 2/2019 | Kreder et al. | |
| 2019/0236591 A1 | 8/2019 | Iaremenko et al. | |
| 2019/0319792 A1 | 10/2019 | Irwan et al. | |
| 2019/0340588 A1 | 11/2019 | Haldenby et al. | |
| 2021/0234678 A1 | 7/2021 | Armleder | |

FOREIGN PATENT DOCUMENTS

| | | | |
|---|---|---|---|
| EP | 1752937 | A1 | 2/2007 |
| EP | 2375626 | A1 | 10/2011 |
| EP | 3474209 | A1 | 4/2019 |
| KR | 20190007196 | A | 1/2019 |
| WO | 2014037812 | A1 | 3/2014 |
| WO | 2014106181 | A2 | 7/2014 |
| WO | 2018014103 | A1 | 1/2018 |
| WO | 2018162099 | A1 | 9/2018 |
| WO | 2019032659 | A1 | 2/2019 |
| WO | 2020058861 | A1 | 3/2020 |
| WO | 2020150741 | A1 | 7/2020 |
| WO | 2022096717 | A1 | 5/2022 |

* cited by examiner

METHODS AND APPARATUS FOR DIGITAL SIGNATURES

RELATED APPLICATIONS

The present application claims priority to European Patent Application No. EP 21195614.9, filed Sep. 8, 2021, and to European Patent Application No. EP 22150341.0, filed Jan. 5, 2022, the contents of which are hereby incorporated by reference in their entirety.

BACKGROUND INFORMATION

The present disclosure relates to digital signatures. For examples, digital signatures can be used to sign blockchain transactions, smart contracts, or to provide time stamping. While many methods are known to provide digital signatures, they have certain shortcomings and disadvantages, particularly with regard to traceability and security against forgery.

BRIEF DESCRIPTION OF THE DRAWINGS

Embodiments of the present technology will now be described with reference to the accompanying drawings, and the embodiments should be understood to explain, but not to limit, the scope of the present technology.

DETAILED DESCRIPTION

Figure 1:
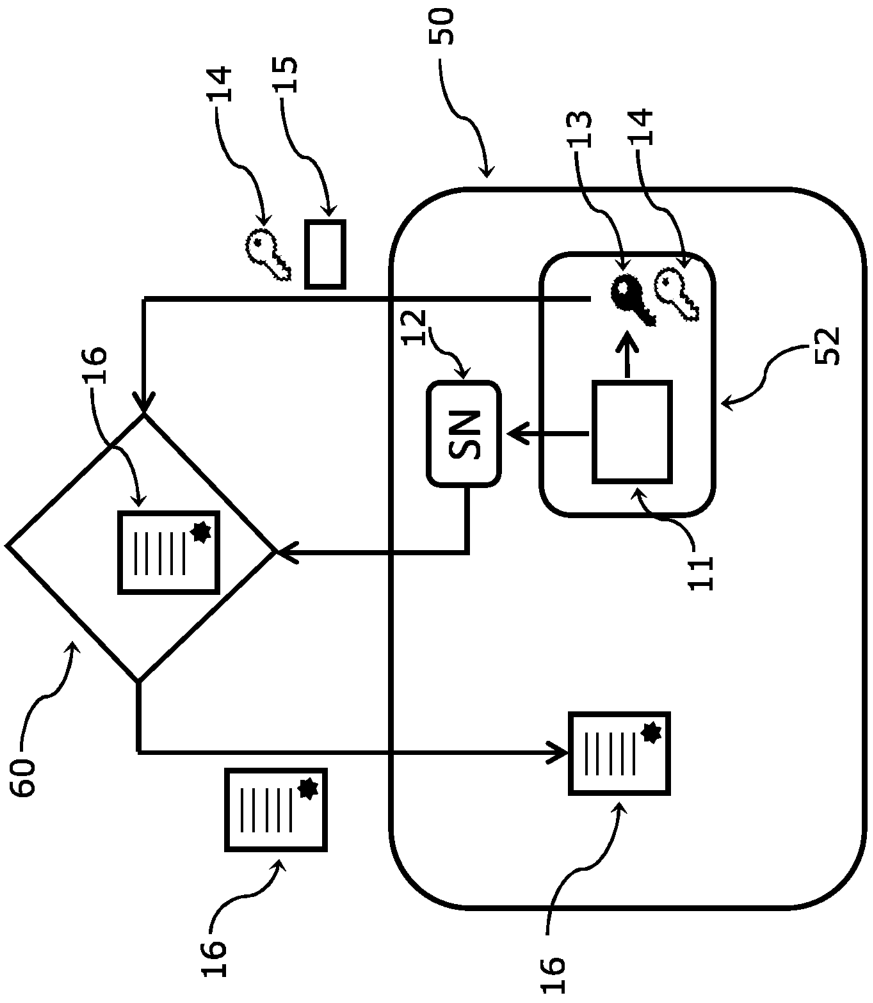
FIG. 1 depicts a setup of a data processing apparatus according to an embodiment of the present technology.

The features of the present disclosure seek to overcome or at least alleviate the shortcomings and disadvantages of prior art methods. It is therefore an object of the features of the present disclosure to provide a technology for digital signatures that is improved vis-à-vis the prior art, e.g., with regard to traceability and/or security against forgery. These objects are met by features of the present disclosure.

In a first aspect, the present disclosure relates to a method. The method comprises providing a data processing apparatus, wherein the data processing apparatus comprises a secure portion, wherein the secure portion comprises a private key that cannot be extracted from the secure portion, wherein the secure portion comprises a public key corresponding to the private key; the data processing apparatus providing a signing request, the public key, and a serial number; based on the signing request, the public key, and the signing request, an external data processing apparatus generating a signed digital certificate; and providing the signed digital certificate to the data processing apparatus. It should be understood that the method according to the first aspect relates to setting up and initializing the data processing apparatus. To differentiate the data processing apparatus pre and post initialization, the data processing apparatus that has not yet been initialized may also be referred to as native or initial data processing apparatus.

The secure portion may comprise a random number generator that cannot be extracted from the secure portion, and the method may comprise the random number generator generating the serial number.

The private key may be generated based on an output from the random number generator.

The data processing apparatus may be a smart card.

The smart card may have near field communication functionality.

The method may comprise providing the signed digital certificate to a data processing system; the data processing system receiving personal user data from a user; providing a public certificate key to the data processing system; the data processing system generating a signed digital system certificate signed with the public certificate key based on the personal user data, the signed digital certificate, and the public certificate key; and providing the signed digital system certificate to the data processing apparatus. It should be understood that providing a public certificate key to the data processing system also encompasses that the public certificate key is generated by the data processing system.

The method may comprise generating the public certificate key and a corresponding private certificate key; encrypting the private certificate key with the public key and thus generating a wrapped key; and providing the wrapped key to the secure portion of the data processing apparatus.

Generating the public certificate key and the corresponding private certificate key, encrypting the private certificate key with the public key to thus generate the wrapped key, and providing the wrapped key to the secure portion of the data processing apparatus may be performed by the data processing system, and wherein the wrapped key is provided from the data processing system to the secure portion of the data processing apparatus.

Generating the public certificate key and the corresponding private certificate key, encrypting the private certificate key with the public key to thus generate the wrapped key, and providing the wrapped key to the secure portion of the data processing apparatus may be performed by a further data processing system; and the method may further comprise providing the public key from the data processing apparatus to the further data processing system; wherein providing the public certificate key to the data processing system comprises providing the public certificate key from the further data processing system to the data processing system.

The method may comprise: in the secure portion, unencrypting the wrapped key with the private key and thus obtaining the private certificate key.

The method may comprise: in the secure portion, generating a seed based on the private certificate key.

By means of the described method, the data processing apparatus may be set up and initialized. It will be understood that after performing the method, the data processing apparatus comprises the signed digital certificate and the signed digital system certificate (signed by the public certificate key). Furthermore, the secure portion of the data processing apparatus then also comprises the seed, the private key and the private certificate key.

In a further aspect, the present disclosure relates to an initialization method to initialize a data processing apparatus comprising a secure portion, wherein the initialization method comprises: generating a remote asymmetric key pair comprising a remote private key and a remote public key in a remote signature system, providing the remote public key to the secure portion of the data processing apparatus, and generating signing credentials, wherein the remote signature system is configured to sign a data structure when receiving the signing credentials.

The signing credentials may be generated by the remote signature system.

The initialization method may further comprise providing the signing credentials to the data processing apparatus, e.g., to the secure portion of the data processing apparatus.

The present disclosure also relates to a combined method. The combined method comprises the method as discussed above and the initialization method as discussed above. The data processing apparatus of the method is the data processing apparatus of the initialization method. It will be understood that the secure portion of the method is the secure portion of the initialization method.

In another aspect, the present disclosure relates to a data processing apparatus comprising a secure portion; wherein the secure portion comprises a private key, an unencrypted private certificate key, and a seed generated based on a private certificate key, wherein the private key, the unencrypted private certificate key, and the seed are non-extractable from the secure portion.

Such a data processing apparatus, e.g., the data processing apparatus obtained by the method according to the first aspects, may have improved functionality.

In particular, by means of the seed, and the private certificate key, the data processing apparatus may sign signatures, e.g., signatures of transactions that can then be output, e.g., broadcasted.

For example, by using the unencrypted private certificate key, which may be provided by an external entity, additional validation may be provided. For example, the private certificate key may be issued by a recognized entity, and a further user may only recognize a signature if a key issued by such an entity is used, thereby providing a white listing functionality.

The data processing apparatus may comprise a signed digital certificate.

The secure portion comprises may be random number generator.

The data processing apparatus may be a smart card.

The smart card may have near field communication functionality.

The data processing apparatus may comprise a serial number generated by the random number generator.

The data processing apparatus may comprise a signed digital system certificate, wherein the signed digital system certificate is signed with a public certificate key corresponding to the private certificate key, and wherein the signed digital system certificate is based on personal user data, the signed digital certificate and the public certificate key.

As the data processing apparatus may comprise the signed digital certificate and/or the signed digital system certificate, any of these certificates can also be appended to a signature of a transaction, such that the present technology also enables the user of the data processing apparatus to provide identification basis if needed or desired.

The data processing apparatus may be obtainable, and may preferably be obtained, by the method as discussed before.

The described technology and particularly the described method to initialize the data processing apparatus also allows a data processing apparatus with corresponding functionality to be generated, e.g., in case the data processing apparatus is lost. In particular, the private certificate key can again be wrapped and provided to another data processing apparatus in the same manner (i.e., wrapped by a public key), and unencrypted in the same manner. Thus, also another data processing apparatus can be provided with the unencrypted private certificate key and the seed derived from the unencrypted private certificate key to thus provide corresponding functionality to another data processing apparatus, e.g., in case of loss of a data processing apparatus. Corresponding considerations also apply to the digital system certificate, which can also be provided with mostly corresponding data in case a new identification of a user is provided. Overall, embodiments of the present technology therefore also allow the implementation of backup solutions.

It will also be understood that the described technology allows for revocations of the described certificates. That is, e.g., in case a data processing apparatus is lost, the external entities which generated one of the certificates, can revoke the corresponding certificate to thereby increase security of the data processing apparatus.

It will be understood that in some instances, at least one of the certificates of the data processing apparatus may also be output together with signed signatures. This allows to check whether the certificates are still valid.

Furthermore, as discussed, the unencrypted private certificate key is only present in the secure portion of the data processing apparatus and cannot be extracted from it. Thus, the respective data processing apparatus can also not be forged by a user.

The data processing apparatus may be configured to only allow data structures signed by a key derived from seed to be signed by the unencrypted private certificate key.

The data processing apparatus may be configured to only allow data structures signed by a key derived from seed to be signed by the private key.

The present disclosure also relates to a data processing apparatus, wherein the data processing apparatus comprises a secure portion, wherein the secure portion comprises a remote public key.

The data processing apparatus may be initialized by the initialization method discussed above.

In all aspects, the secure portion may comprise a remote public key.

The data processing apparatus may be obtained by the combined method discussed above.

The remote public key may correspond to a remote private key stored in a remote signature system.

The data processing apparatus may further comprise signing credentials to trigger a signature by the remote signature system.

In a still further aspect, the present relates to a method, wherein the method uses the data processing apparatus according to any of the preceding apparatus embodiments, the method comprising the secure portion receiving a signing request, in the secure portion, generating at least one signature, and outputting the at least one signature.

The method may us the data processing apparatus discussed above. Generating at least one signature may comprise generating a signature signed with a private key derived from the seed and signing the signature with the unencrypted private certificate key and thus generating a signature signed with the unencrypted private certificate key, and outputting the at least one signature may comprise outputting the signature signed with the private key derived from the seed and the signature signed with the unencrypted private certificate key.

The method may further comprise: in the secure portion, signing the signature with the private key and thus generating a signature signed with the private key; and outputting the signature signed with the private key together with the signature signed with the private key derived from the seed and the signature signed with the unencrypted private certificate key.

The method may use the data processing apparatus discussed before, and the method may further comprise outputting the signed digital certificate together with the signature signed with the private key derived from the seed and the signature signed with the unencrypted private certificate key.

The method may use the data processing apparatus as discussed before, and the method may further comprise outputting the signed digital system certificate together with the signature signed with the private key derived from the seed and the signature signed with the unencrypted private certificate key.

The method may further comprises: a remote signature system receiving the signing request, the remote signature system signing the signing request with a remote private key corresponding to the remote public key and thus generating a pre-signature, the secure portion receiving the pre-signature, and in the secure portion verifying with the remote public key that the pre-signature is the signing request signed with the remote private key, wherein generating the at least one signature in the secure portion and outputting the at least one signature depend on the successful verification with the remote public key that the pre-signature is the signing request signed with the remote private key.

The method may further comprise the remote signature system receiving signing credentials, wherein the remote signature system signing the signing request with a remote private key corresponding to the remote public key and thus generating a pre-signature may depend on the remote signature system receiving the signing credentials.

The method may further comprise disabling a capability of the remote signature system to sign with the remote private key.

By using this technology, the signature functionality of the data processing apparatus is linked to the remote signature system, which may be, cloud based. In particular, the signature functionality of the data processing apparatus, e.g., a smart card, depends on the data processing apparatus receiving the pre-signature, i.e., the signing request signed with the remote private key of the remote signature system. Only when the pre-signature signed by the remote signature system is received by the data processing apparatus, will the data processing apparatus sign the signing request.

This allows the signing functionality of the data processing apparatus to be controlled by the signing functionality of the remote signature system. For example, in case the data processing apparatus is lost, the respective remote private key in the remote signature system can be blocked, thereby blocking the signing functionality of the data processing apparatus, which may increase security against fraud, e.g., in case the data processing apparatus is stolen.

The features of the present disclosure may also be defined by the following numbered embodiments.

Below, method embodiments will be discussed. These embodiments are abbreviated by the letter M followed by a number. Whenever reference is herein made to method embodiments, those embodiments are meant.

M1. A method comprising providing a data processing apparatus, wherein the data processing apparatus comprises a secure portion, wherein the secure portion comprises a private key that cannot be extracted from the secure portion, wherein the secure portion comprises a public key corresponding to the private key, the data processing apparatus providing a signing request, the public key, and a serial number, based on the signing request, the public key, and the signing request, an external data processing apparatus generating a signed digital certificate, and providing the signed digital certificate to the data processing apparatus.

M2. The method according to the preceding embodiment, wherein the secure portion comprises a random number generator that cannot be extracted from the secure portion, wherein the method comprises the random number generator generating the serial number.

M3. The method according to the preceding embodiment, wherein the private key is generated based on an output from the random number generator.

M4. The method according to any of the preceding embodiments, wherein the data processing apparatus is a smart card.

M5. The method according to the preceding embodiment, wherein the smart card has near field communication functionality.

M6. The method according to any of the preceding embodiments, wherein the method comprises providing the signed digital certificate to a data processing system, the data processing system receiving personal user data from a user, providing a public certificate key to the data processing system, the data processing system generating a signed digital system certificate signed with the public certificate key based on the personal user data, the signed digital certificate, and the public certificate key, providing the signed digital system certificate to the data processing apparatus.

M7. The method according to the preceding embodiment, wherein the method comprises generating the public certificate key and a corresponding private certificate key, encrypting the private certificate key with the public key and thus generating a wrapped key, and providing the wrapped key to the secure portion of the data processing apparatus.

M8. The method according to the preceding embodiment, wherein generating the public certificate key and the corresponding private certificate key, encrypting the private certificate key with the public key to thus generate the wrapped key, and providing the wrapped key to the secure portion of the data processing apparatus are performed by the data processing system, and wherein the wrapped key is provided from the data processing system to the secure portion of the data processing apparatus.

M9. The method according to the penultimate embodiment, wherein generating the public certificate key and the corresponding private certificate key, encrypting the private certificate key with the public key to thus generate the wrapped key, and providing the wrapped key to the secure portion of the data processing apparatus are performed by a further data processing system, wherein the method further comprises providing the public key from the data processing apparatus to the further data processing system, wherein providing the public certificate key to the data processing system comprises providing the public certificate key from the further data processing system to the data processing system.

M10. The method according to any of the 3 preceding embodiments, wherein the method comprises in the secure portion, unencrypting the wrapped key with the private key and thus obtaining the private certificate key.

M11. The method according to the preceding embodiment, wherein the method comprises in the secure portion, generating a seed based on the private certificate key.

Below, initialization embodiments will be discussed. These embodiments are abbreviated by the letter I followed by a number. Whenever reference is herein made to initialization embodiments, those embodiments are meant.

I1. An initialization method to initialize a data processing apparatus comprising a secure portion, wherein the initialization method comprises generating a remote asymmetric key pair comprising a remote private key and a remote public key in a remote signature system, providing the remote public key to the secure portion of the data processing apparatus, and generating signing credentials, wherein the remote signature system is configured to sign a data structure when receiving the signing credentials.

I2. The initialization method according to the preceding embodiment, wherein the signing credentials are generated by the remote signature system.

I3. The initialization method according to any of the 2 preceding embodiments, further comprising providing the signing credentials to the data processing apparatus, e.g., to the secure portion of the data processing apparatus.

C1. A combined method, wherein the combined method comprises the method according to any of the preceding method embodiments and the initialization method according to any of the preceding initialization embodiments, wherein the data processing apparatus of the method is the data processing apparatus of the initialization method.

It will be understood that the secure portion of the method is the secure portion of the initialization method.

Below, apparatus embodiments will be discussed. These embodiments are abbreviated by the letter A followed by a number. Whenever reference is herein made to apparatus embodiments, these embodiments are meant.

A1. A data processing apparatus comprising a secure portion, wherein the secure portion comprises a private key, an unencrypted private certificate key, and a seed generated based on a private certificate key, wherein the private key, the unencrypted private certificate key, and the seed are non-extractable from the secure portion.

A2. The data processing apparatus according to the preceding embodiment, wherein the data processing apparatus comprises a signed digital certificate.

A3. The data processing apparatus according to any of the preceding apparatus embodiments, wherein the secure portion comprises a random number generator.

A4. The data processing apparatus according to any of the preceding apparatus embodiments, wherein the data processing apparatus is a smart card.

A5. The data processing apparatus according to the preceding embodiment, wherein the smart card has near field communication functionality.

A6. The data processing apparatus according to any of the preceding embodiments with the features of embodiment A3, wherein the data processing apparatus comprises a serial number generated by the random number generator.

A7. The data processing apparatus according to any of the preceding apparatus embodiments, wherein the data processing apparatus comprises a signed digital system certificate, wherein the signed digital system certificate is signed with a public certificate key corresponding to the private certificate key, and wherein the signed digital system certificate is based on personal user data, the signed digital certificate and the public certificate key.

A8. The data processing apparatus according to any of the preceding apparatus embodiments, wherein the data processing apparatus is obtainable, and preferably obtained, by the method according to embodiment M11.

A9. The data processing apparatus according to any of the preceding apparatus embodiments, wherein the data processing apparatus is configured to only allow data structures signed by a key derived from seed to be signed by the unencrypted private certificate key.

A10. The data processing apparatus according to any of the preceding apparatus embodiments, wherein the data processing apparatus is configured to only allow data structures signed by a key derived from seed to be signed by the private key.

A11. A data processing apparatus, wherein the data processing apparatus comprises a secure portion, wherein the secure portion comprises a remote public key.

A12. The data processing apparatus according to the preceding embodiment, wherein the data processing apparatus is initialized by the initialization method according to any of the preceding initialization embodiments.

A13. The data processing apparatus according to any of the embodiments A1 to A10, wherein the secure portion comprises a remote public key.

A14. The data processing apparatus according to the preceding embodiment, wherein the data processing apparatus is obtained by the combined method according to embodiment C1.

A15. The data processing apparatus according to any of the 4 preceding embodiments, wherein the remote public key corresponds to a remote private key stored in a remote signature system.

A16. The data processing apparatus according to the preceding embodiment, wherein the data processing apparatus further comprises signing credentials to trigger a signature by the remote signature system.

N1. A method, wherein the method uses the data processing apparatus according to any of the preceding apparatus embodiments, the method comprising the secure portion receiving a signing request, in the secure portion, generating at least one signature, and outputting the at least one signature.

N2. The method according to the preceding embodiment, wherein the method uses the data processing apparatus according to any of the preceding apparatus embodiments with the features of embodiment A1, wherein generating at least one signature comprises generating a signature signed with a private key derived from the seed and signing the signature with the unencrypted private certificate key and thus generating a signature signed with the unencrypted private certificate key, and outputting the at least one signature comprises outputting the signature signed with the private key derived from the seed and the signature signed with the unencrypted private certificate key.

N3. The method according to the preceding embodiment, wherein the method further comprises in the secure portion, signing the signature with the private key and thus generating a signature signed with the private key, outputting the signature signed with the private key together with the signature signed with the private key derived from the seed and the signature signed with the unencrypted private certificate key.

N4. The method according to any of the 2 preceding embodiments, wherein the method uses the data processing apparatus according to any of the preceding apparatus embodiments with the features of embodiment A2, wherein the method further comprises outputting the signed digital certificate together with the signature signed with the private key derived from the seed and the signature signed with the unencrypted private certificate key.

N5. The method according to any of the 3 preceding embodiments, wherein the method uses the data processing apparatus according to any of the preceding apparatus embodiments with the features of embodiment A7, wherein the method further comprises outputting the signed digital system certificate together with the signature signed with the private key derived from the seed and the signature signed with the unencrypted private certificate key.

N6. The method according to any of the 5 preceding embodiments, wherein the method uses the data processing apparatus according to any of the preceding apparatus embodiments with the features of embodiment A11 or A13, wherein the method further comprises a remote signature system receiving the signing request, the remote signature system signing the signing request with a remote private key corresponding to the remote public key and thus generating a pre-signature, the secure portion receiving the pre-signature, and in the secure portion verifying with the remote public key that the pre-signature is the signing request signed with the remote private key, wherein generating the at least one signature in the secure portion and outputting the at least one signature depend on the successful verification that the pre-signature is the signing request signed with the remote private key with the remote public key.

N7. The method according to the preceding embodiment, wherein the method further comprises the remote signature system receiving signing credentials, wherein the remote signature system signing the signing request with a remote private key corresponding to the remote public key and thus generating a pre-signature depends on the remote signature system receiving the signing credentials.

N8. The method according to any of the 2 preceding embodiments, wherein the method further comprises disabling a capability of the remote signature system to sign with the remote private key.

FIG. 1 depicts a data processing apparatus 50 that may be realized as a smart card, e.g., a smart card with near field communication (NFC) functionality. In the following, reference will also be made to smart card 50, but the skilled person will understand that data processing apparatus 50 may also be realized in a different manner than a smart card, independent of whether reference is made to a smart card or a data processing apparatus. Prior to its initialization, the data processing apparatus 50 may also be referred to as original or native data processing apparatus 50.

The data processing apparatus 50 comprises a secure portion 52, which may also be referred to as secure enclave 52. The secure portion 52 can provide hardware and software protection for maintaining the secrecy of data in the secure portion 52. More particularly, the data processing apparatus 50 (e.g., the smart card) can be programmed so that only defined data may leave the secure portion 52, while other data cannot leave the secure portion 52. The secure portion 52 can comprise one or more secure microcontroller and one or more secure memory components.

The secure portion 52 comprises a random number generator 11 (and it should be understood that this term also encompassed a pseudo random number generator).

Figure 5:
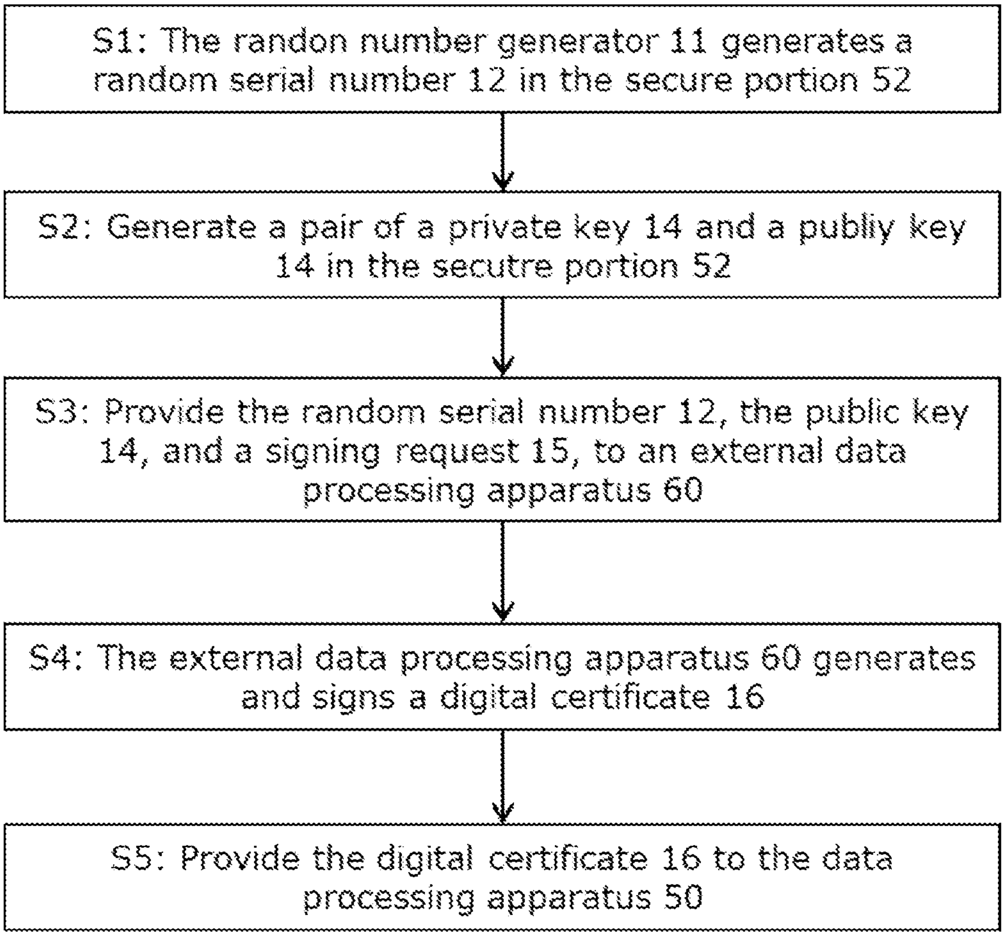
FIG. 5 depicts a flow chart diagram of a setup of a data processing apparatus corresponding to FIG. 1.

In a first step S1 (also see FIG. 5), the random number generator 11 generates a random serial number 12. Furthermore, in a step S2, a pair of a private key 13 and a public key 14 is generated in the secure portion 52. The keys 13, 14 are asymmetric cryptographic keys. This may be based on a random number generated by the random number generator 11, and it should be understood that it is not critical whether step S2 is carried out after step S1 or before. The data processing apparatus 50 is configured such that the private key 13 cannot be extracted from the secure portion 52.

In a further step S3, the random serial number 12, the public key 14 and a signing request 15 are provided to an external data processing apparatus 60, and the external data processing apparatus 60 generates and signs a digital certificate 16 in a step S4, e.g., by using a root certificate.

The digital certificate 16 may be an X509 digital certificate and is signed by a root certificate of the external data processing apparatus 60. The digital certificate 16 contains the serial number 12, the public key 14, and may additionally contain information relating to the type of the data processing apparatus 50. The digital certificate 16 may provide functionality relating to on card digital signature and decryption.

In a further step S5, the digital certificate 16 is provided to the data processing apparatus 50. After this step, the data processing apparatus 50 is unique by its serial number 12 and cannot be forged due to the digital certificate 16.

It will be understood that the steps S1 to S5 described in conjunction with FIG. 1 typically relate to a factory setup of the data processing apparatus 50, e.g., smart card 50.

Figure 2A:
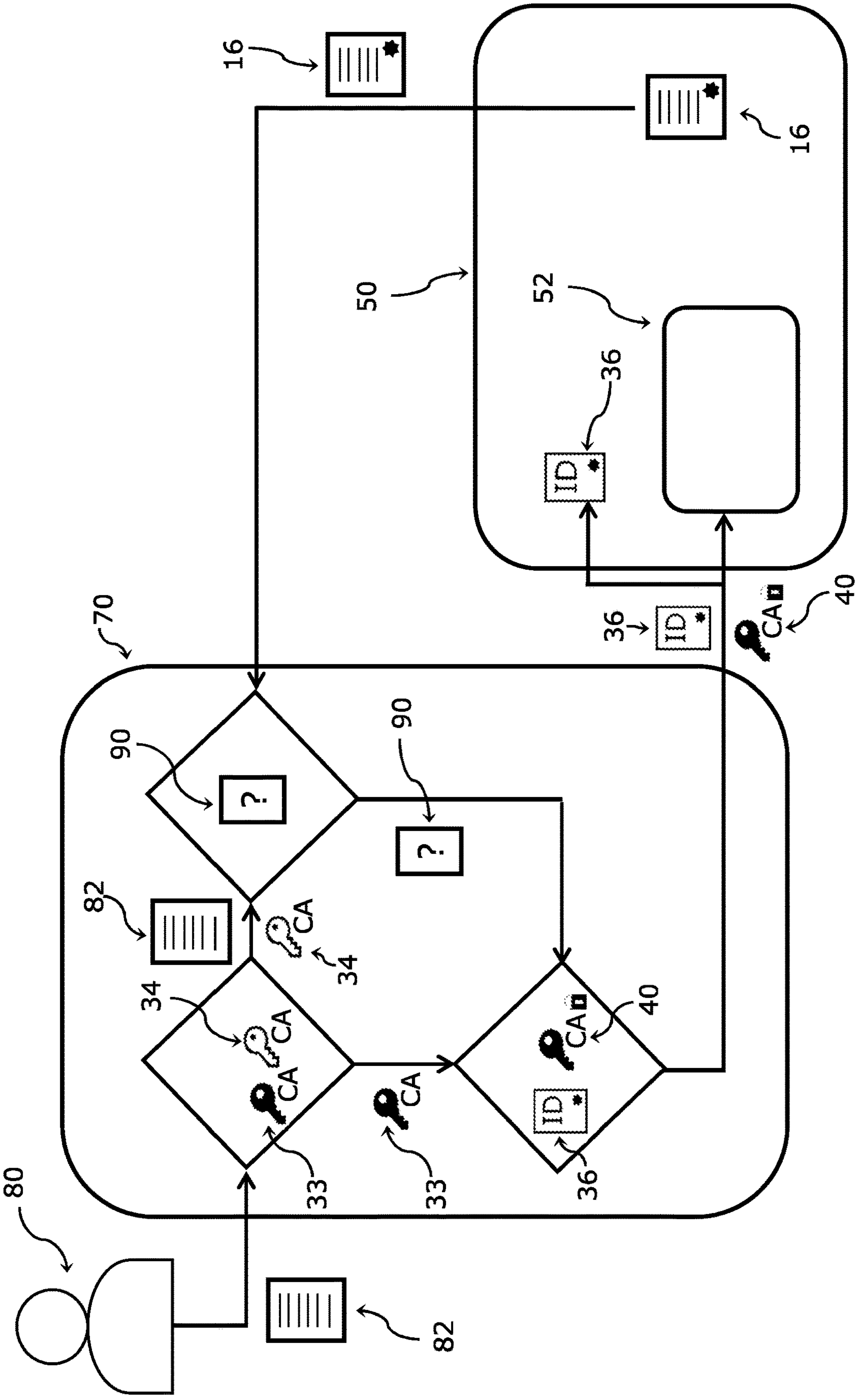
FIG. 2*a* depicts an initialization of a data processing apparatus according to an embodiment of the present technology.
Figure 6:
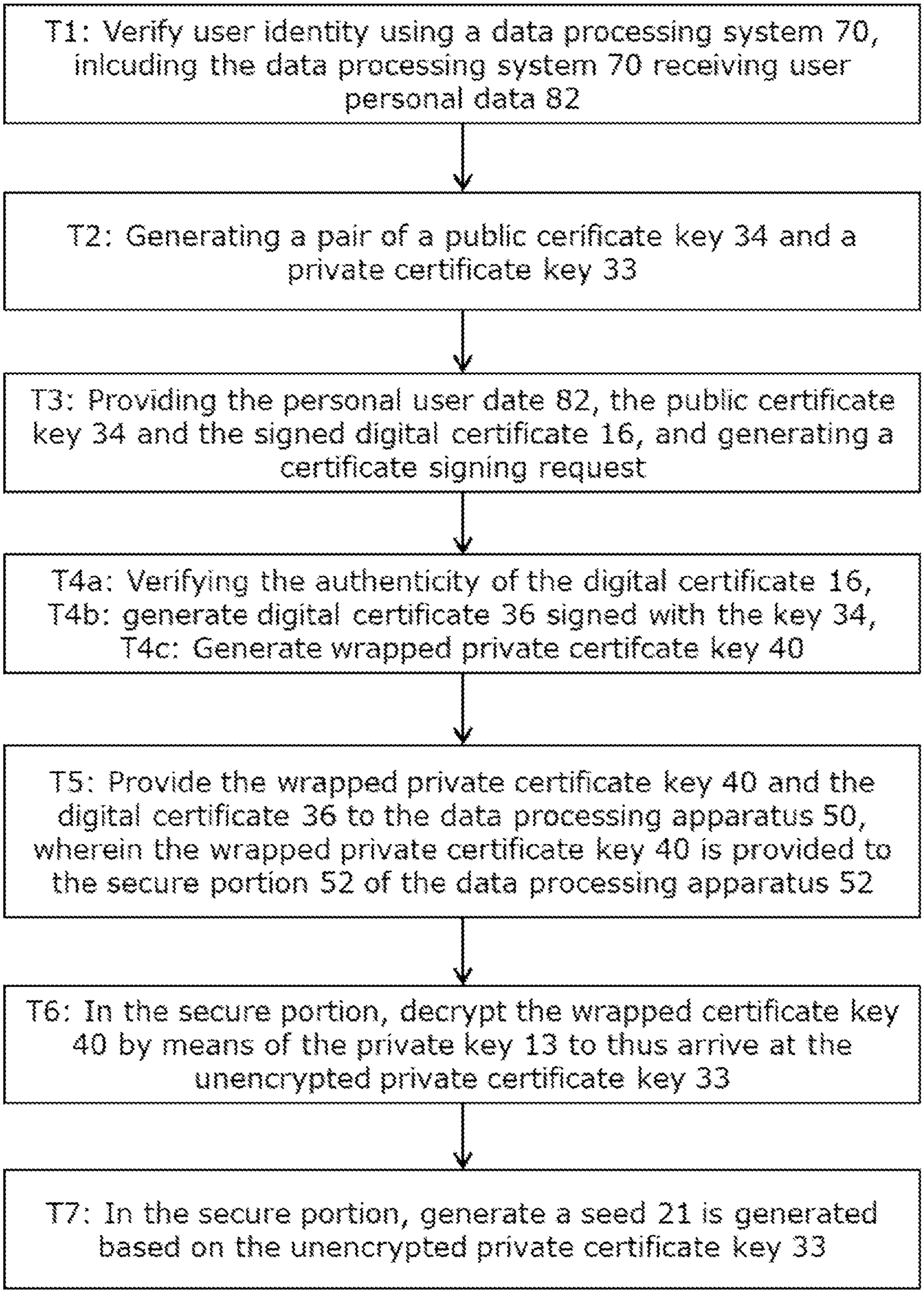
FIG. 6 depicts a flow chart diagram of an initialization of a data processing apparatus corresponding to FIGS. 2*a* or 2*b*, and 3.

As depicted in FIG. 2*a* and FIG. 6, in a step T1, an identity of a user 80 may be verified by using a data processing system 70, which may also be referred to as third party certification system 70 or third party certification authority 70. It should be understood that the data processing system 70 typically comprises a processor and a memory to store data. During the identify verification process, the user may provide personal data 82 to the data processing system 70.

In a further step T2, the data processing system 70 generates a pair of a public certificate key 34 and a private certificate key 33. It should be understood that these keys are normal asymmetric cryptographic keys and the specification that these keys are "certificate" keys should merely differentiate them from the keys 13 and 14. It should thus be understood that the certificate keys 33, 34 are different from keys 13, 14.

In a step T3, the public certificate key 34 and the personal user data 82 are provided, and furthermore, the signed digital certificate 16 are provided (the latter one from the data processing apparatus 50), and a certificate signing request 90 is generated based thereon. In the depicted embodiment, this step T3 is performed in the data processing system 70. However, it should be understood that this step T3 may also be performed external to the data processing system 70.

A further step T4 may be performed in the data processing system 70, wherein step T4 may comprise different sub-steps. In a sub-step T4*a*, the authenticity of the digital certificate 16 may be verified. In a sub-step T4*b*, a digital certificate 36 signed with the public certificate key 34 may be generated, which will be referred to as digital system certificate 36 (merely to differentiate its terminology from digital certificate 16). The digital system certificate 36 may include the personal user data 82 (e.g., a name of the user, a passport ID of the user, and/or an address of the user), the public certificate key 34, and the signed digital certificate 16. In a sub-step T4*c*, the private certificate key 33 may be encrypted with the public key 14 to thus generated wrapped (or encrypted) private certificate key 40 (in this regard, it is noted that the public key 14 is contained in the signed digital certificate 16 and thus also in the certificate signing request 90).

In a step T5, the wrapped private certificate key 40 and the digital system certificate 36 are provided to the data processing apparatus 50.

Figure 2B:
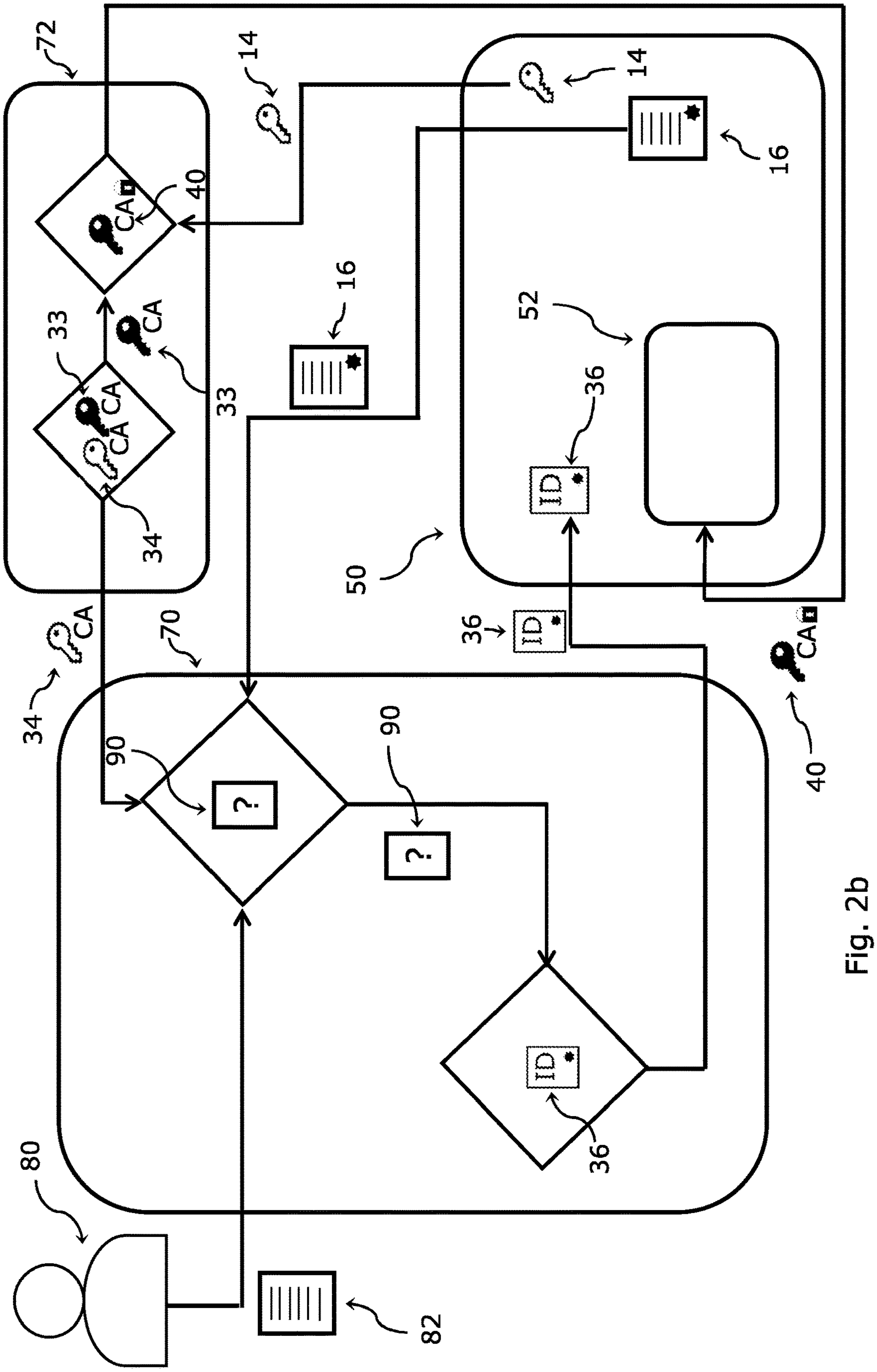
FIG. 2*b* depicts another initialization of a data processing apparatus according to another embodiment of the present technology.

However, while many functionalities were described to be performed by the data processing system 70 in the embodiment depicted in FIG. 2*a*, it should be understood that this is merely exemplary and that the functionalities and steps may also be performed by different systems. This is exemplarily depicted in FIG. 2*b*. The functionality of the embodiment depicted in FIG. 2*b* mostly correspond to the functionality of the embodiment depicted in FIG. 2*a*. However, the embodiment in FIG. 2*b* comprises a further data processing system 72 and some of the functionalities are realized in this further data processing system 72, which typically comprises a processor and a memory. The additional data processing system 72 may be, e.g., a hardware security module.

In particular, the further data processing system 72 may generate the pair of the public certificate key 34 and the private certificate key 33 (i.e., step T2, see FIG. 6), and the public certificate key 34 may be provided to the data processing system 70. In the data processing system 70, it is used to generate the certificate signing request 90 (step T3) and to generate the digital system certificate 36 signed with the public certificate key 34 (as previously discussed). Again, this digital certificate key may then be provided to the data processing apparatus 50.

Furthermore, the public key 14 may be provided from the data processing apparatus 50 to the additional data processing system 72 (where it will be understood that the public key 14 may be extracted from the secure portion 52 of the data processing apparatus 50). Further still, in the additional data processing system 72, the private certificate key 33 may be wrapped (i.e., encrypted) with the public key 14 (sub step T4*c*) to thus generate the wrapped private certificate key 40, which can then be provided to the data processing apparatus (part of step T5).

Figure 3:
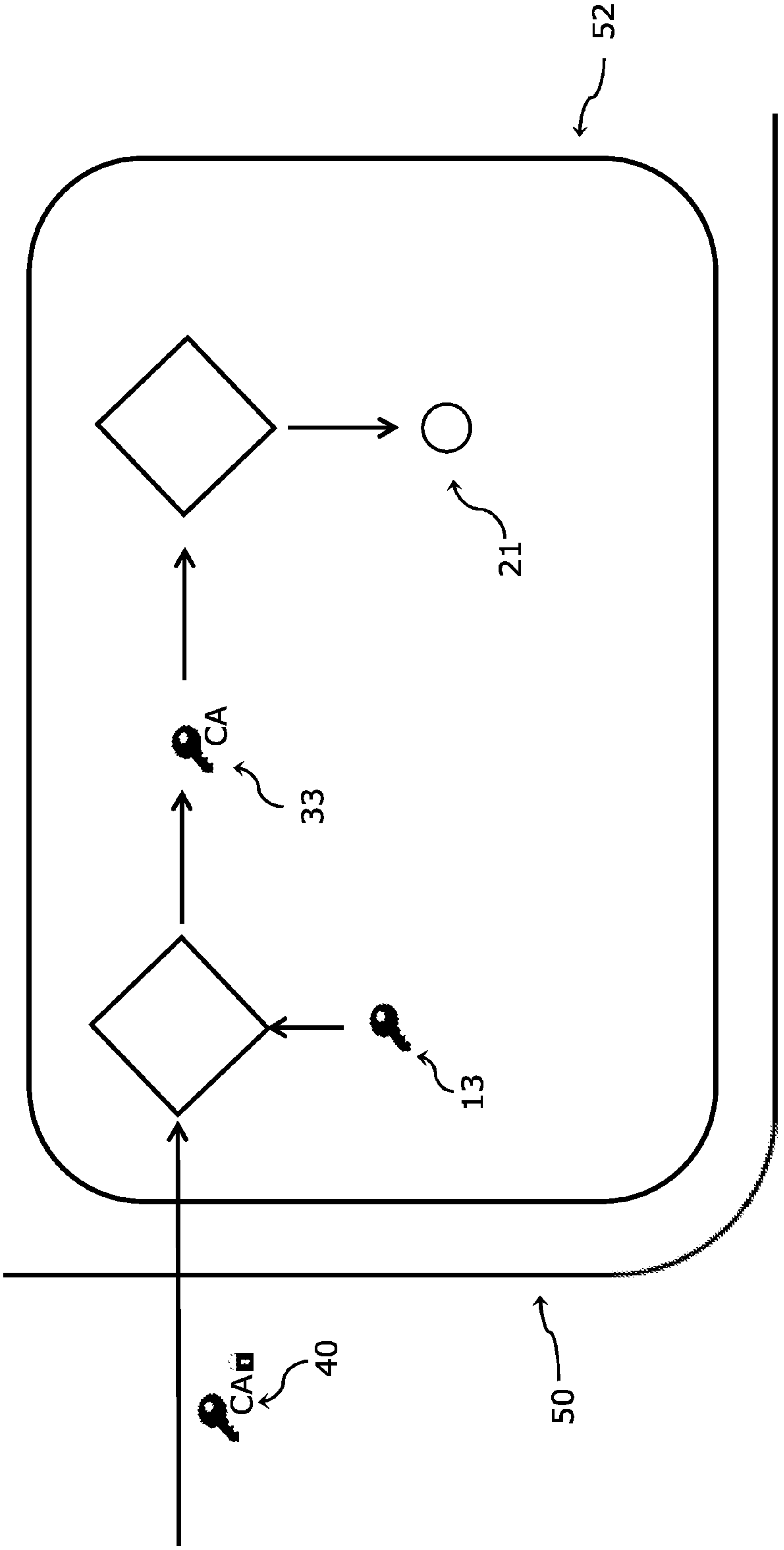
FIG. 3 depicts in more detail steps of an initialization of embodiments of the present technology.

FIG. 3 depicts an enlarged section of the data processing apparatus 50 to further illustrate additional steps performed after the processing apparatus 50 receives the wrapped certificate key 40. As depicted, the wrapped certificate key 40 is provided to the secure portion 52 of the data processing apparatus 50.

In a step T6 performed in the secure portion 52, the wrapped certificate key 40 is decrypted by means of the private key 13 to thus arrive at the unencrypted private certificate key 33, which cannot be extracted from the secure portion 52. In a step T7 performed in the secure portion 52, based on the unencrypted private certificate key 33, a seed 21 is generated. For example, the seed 21 may be generated from the unencrypted private certificate key 33 via a hard coded secret derivation function inside the secure portion 52 of the data processing apparatus 50. For example, the seed 21 may be a BIP32 seed, and it may be derived by means of a multiple SHA256 and AES encryption algorithm.

Thus, after completion of the step T7, there is a seed 21 in the secure portion 52 of the data processing apparatus 50.

Generally, it will be understood that the steps T1 to T7 may relate to the initialization of the data processing apparatus. By means of the initialization, the data processing apparatus 50 may be equipped with additional functionalities.

Figure 4:
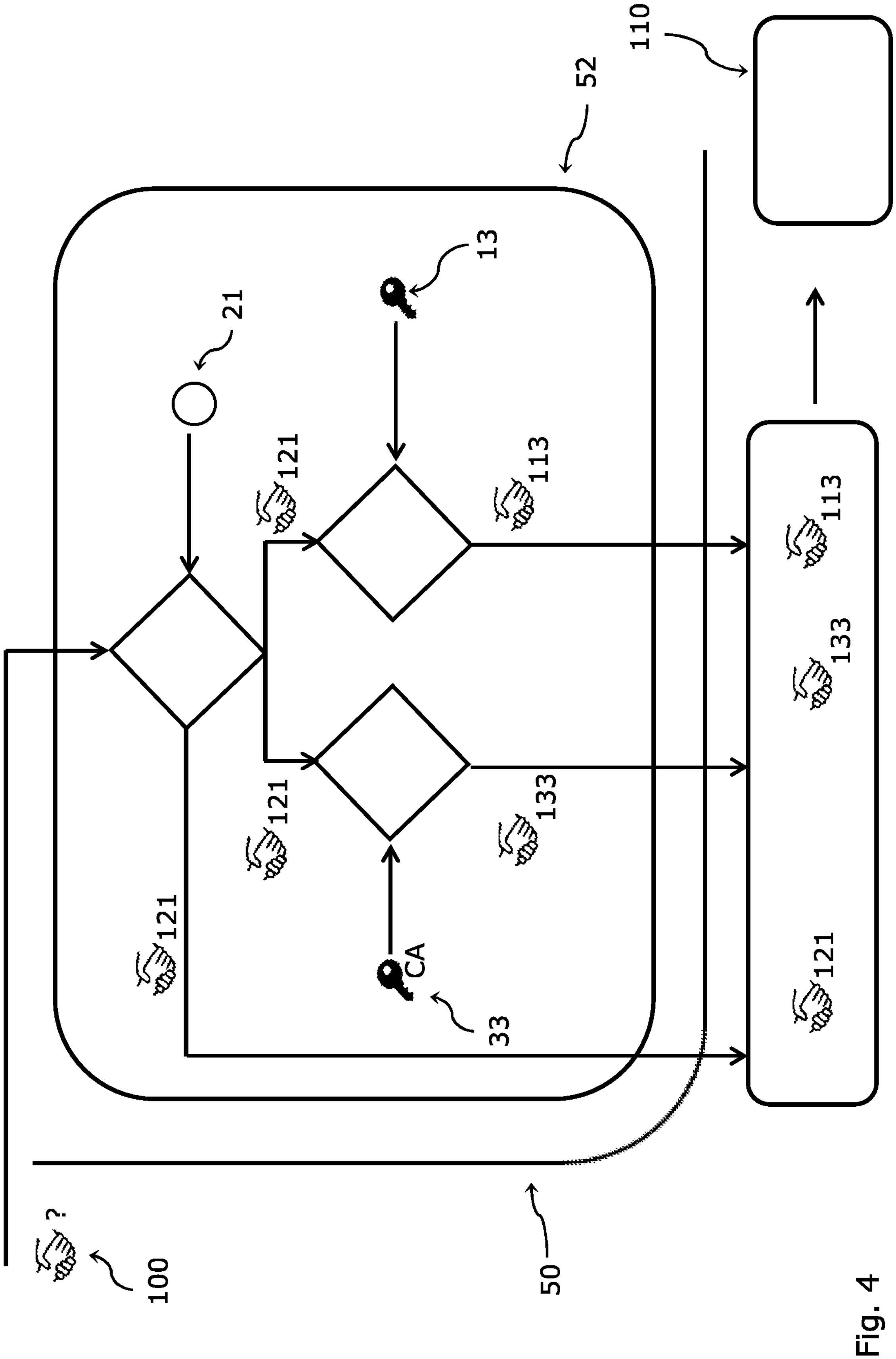
FIG. 4 depicts a signing procedure according to embodiments of the present technology.
Figure 7:
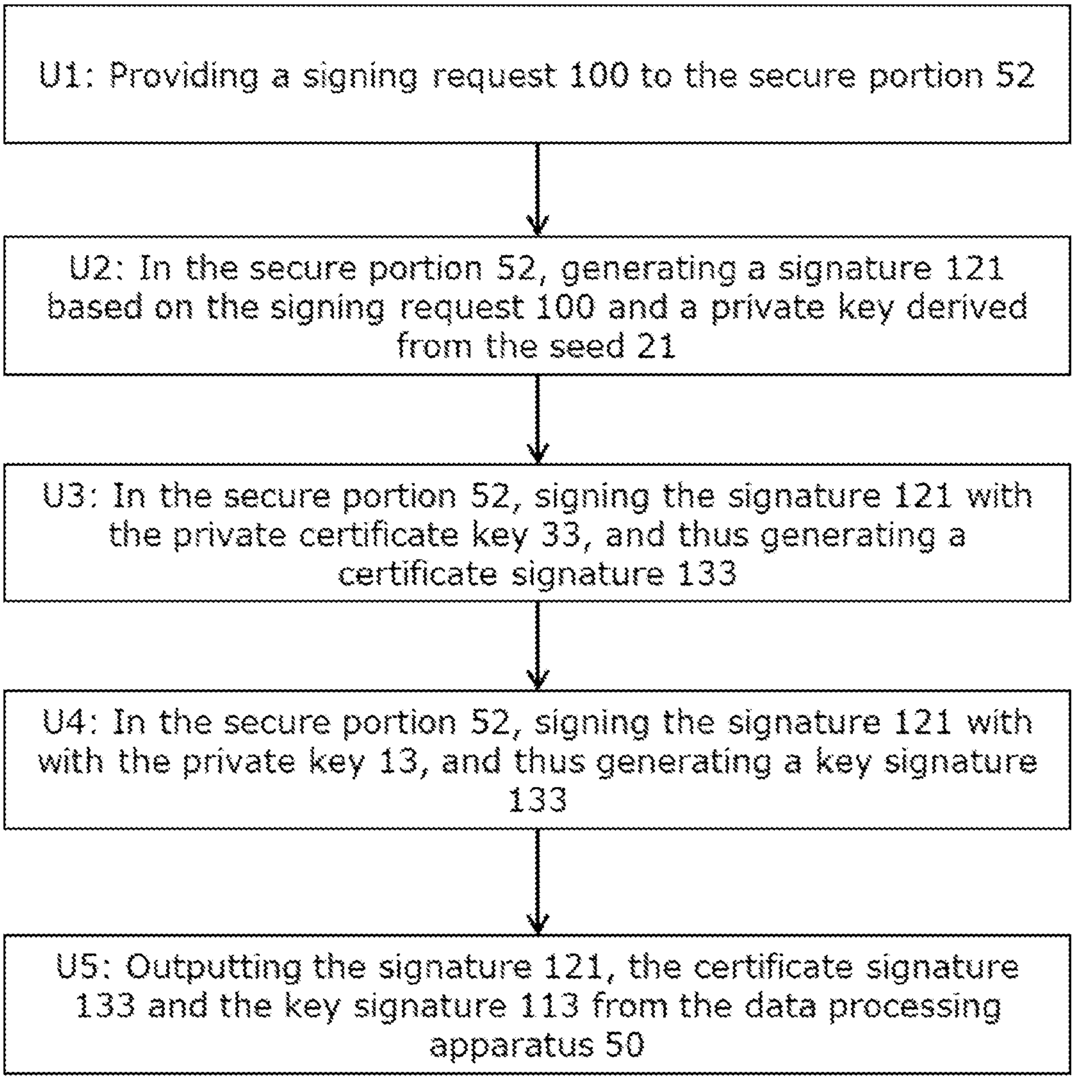
FIG. 7 depicts a flow chart diagram of a signing procedure corresponding to FIG. 5.

For example, the data processing apparatus 50 may be used as discussed in conjunction with FIG. 4 and FIG. 7.

In a step U1, a signing request 100 is provided to the data processing apparatus 50 and more particularly to the secure portion 52 thereof. For example, the signing request 100 may be a signing request 100 relating to a transaction on a blockchain network, or signing request relating to a smart contract.

In a step U2, the respective signing request is fulfilled, i.e., the respective signature 121 for the request is generated. The signature 121 is generated based on the signing request 100 and a private key derived from the seed 21, and it should be understood that both the seed 21 and the private key derived from the seed 21 are non-extractable from the secure portion 52.

In a step U3, the signature 121 is further signed with the private certificate key 33 and thus, a certificate signature 133 is generated, which is the signature 121 signed with the private certificate key 33.

In a step U4, the signature 121 may further be signed with the private key 13 and thus, a key signature 133 may be generated, which is the signature 121 signed with the private key 13.

The data processing apparatus 50 may configured (e.g., hard coded) so that private certificate key 33 and private key 13 can only be used to sign data structures that have previously signed by a key derived from the seed 21.

In a step U5, the signature 121, the certificate signature 133 and the key signature 113 (if present) may be output from the data processing apparatus 50, e.g., these data may be broadcast and may be provided, e.g., to a blockchain node to cause a blockchain transaction. However, it should be understood that the present technology is not limited to blockchain implementations, but may also be used in conjunction, e.g., with smart contracts, time stamping, or compliance data.

It will be understood that the seed 21 is generated based on the private certificate key 33 (see FIG. 3). Thus, the signed transaction signature 121 can only be generated when the data processing apparatus 50 has been initialized as described before (as otherwise, the data processing apparatus 50 would not have access to the seed 21). This also applies to the signed transaction signatures 133 and 113, as they are based on the signed transaction signature 121 (based on the seed 21, which in turn is based on a proper initialization). For signed transaction signature 133, the dependency on the proper initialization is further caused by the transaction signature 133 being signed by private certificate key 33, which is also only present on the data processing apparatus 50 after a successful initialization.

As discussed, the data processing apparatus 50 may be configured so that it can only sign digital signatures (e.g., generate signatures 121, 133, and 113), but not sign data structures different to digital signatures. Further still, the data processing apparatus 50 may also be configured so that the private certificate key 33 and the private key 13 can only be used to sign signatures which have been signed by a key derived from seed 21. By limiting the capabilities of which data structure can be signed, the risk of forgery can be greatly reduced.

Furthermore, it will be understood that the data processing apparatus 50 may also output the signed digital certificate 16 and/or the digital system certificate 36 signed with public key 34.

Further embodiments of the present technology are described below with reference to FIGS. 8 and 10.

Figure 8:
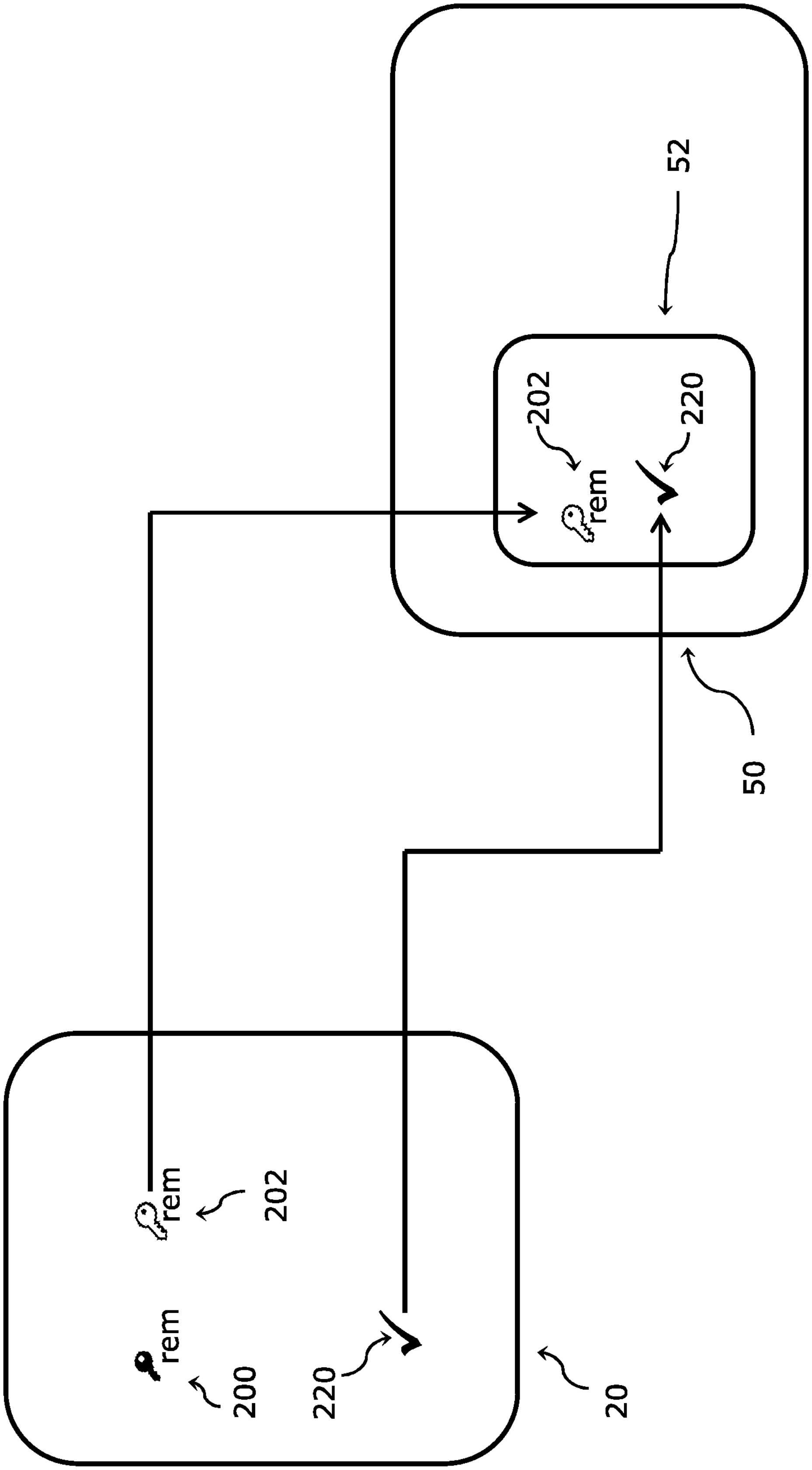
FIG. 8 depicts a further initialization of a data processing apparatus according to an embodiments of the present technology (that may be used together with or independently from the initialization of FIGS. 2*a*/2*b*).

It should be understood that FIG. 8 an initialization procedure for initializing a data processing apparatus 50. It should further be understood that the initialization steps discussed in conjunction with FIG. 8 may be additional steps of the initialization discussed in conjunction with FIG. 2*a* or 2*b*. That is, the skilled person will understand that the steps described with reference to FIG. 8 can be performed in addition to the steps described with reference to FIG. 2*a* and/or 2*b*. However, the initialization steps discussed in conjunction with FIG. 8 may also be performed independently from the steps described in conjunction with FIGS. 2*a* and 2*b*.

Figure 9:
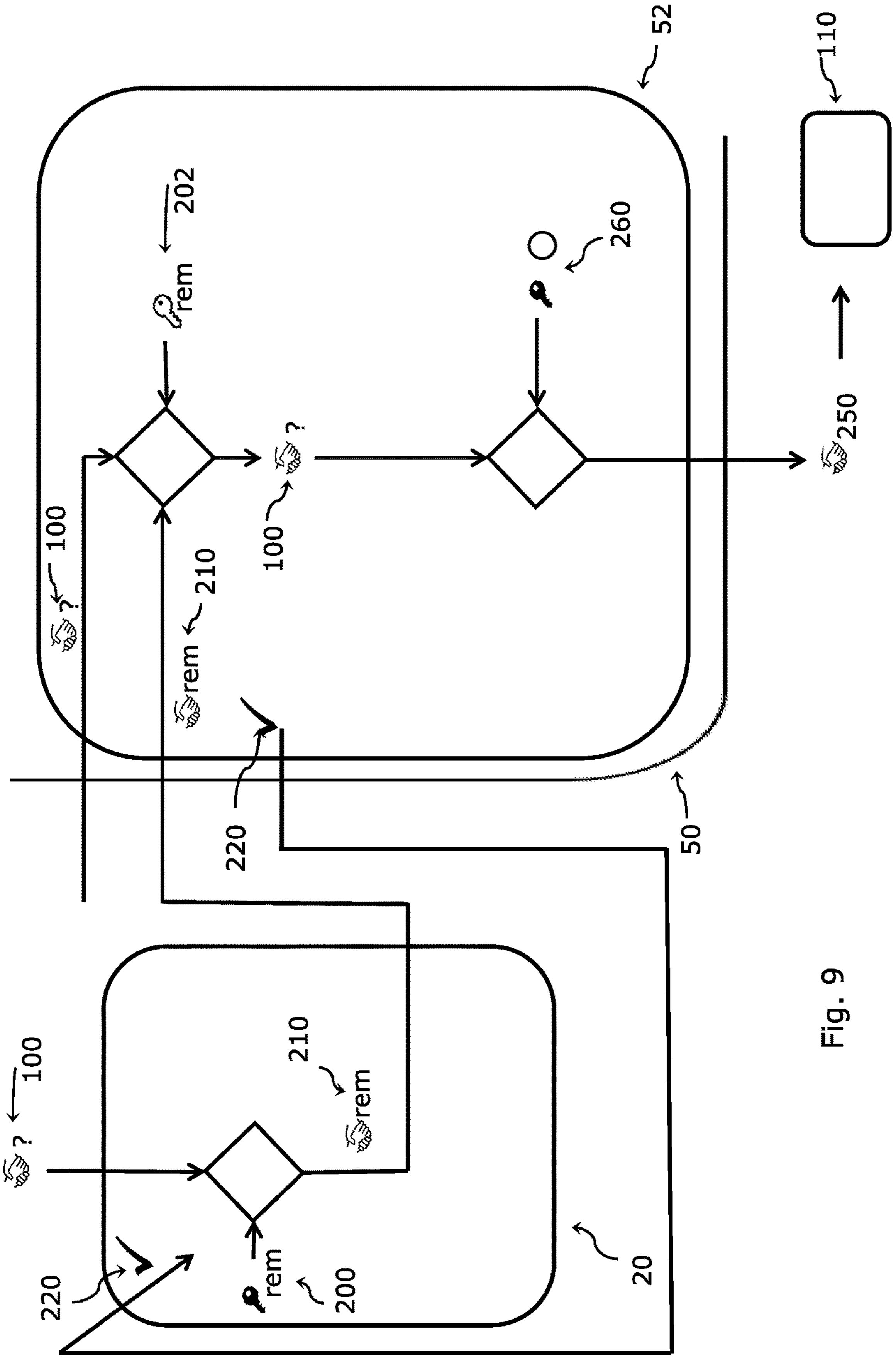
FIG. 9 depicts a signing procedure according to embodiments of the present technology.
Figure 10:
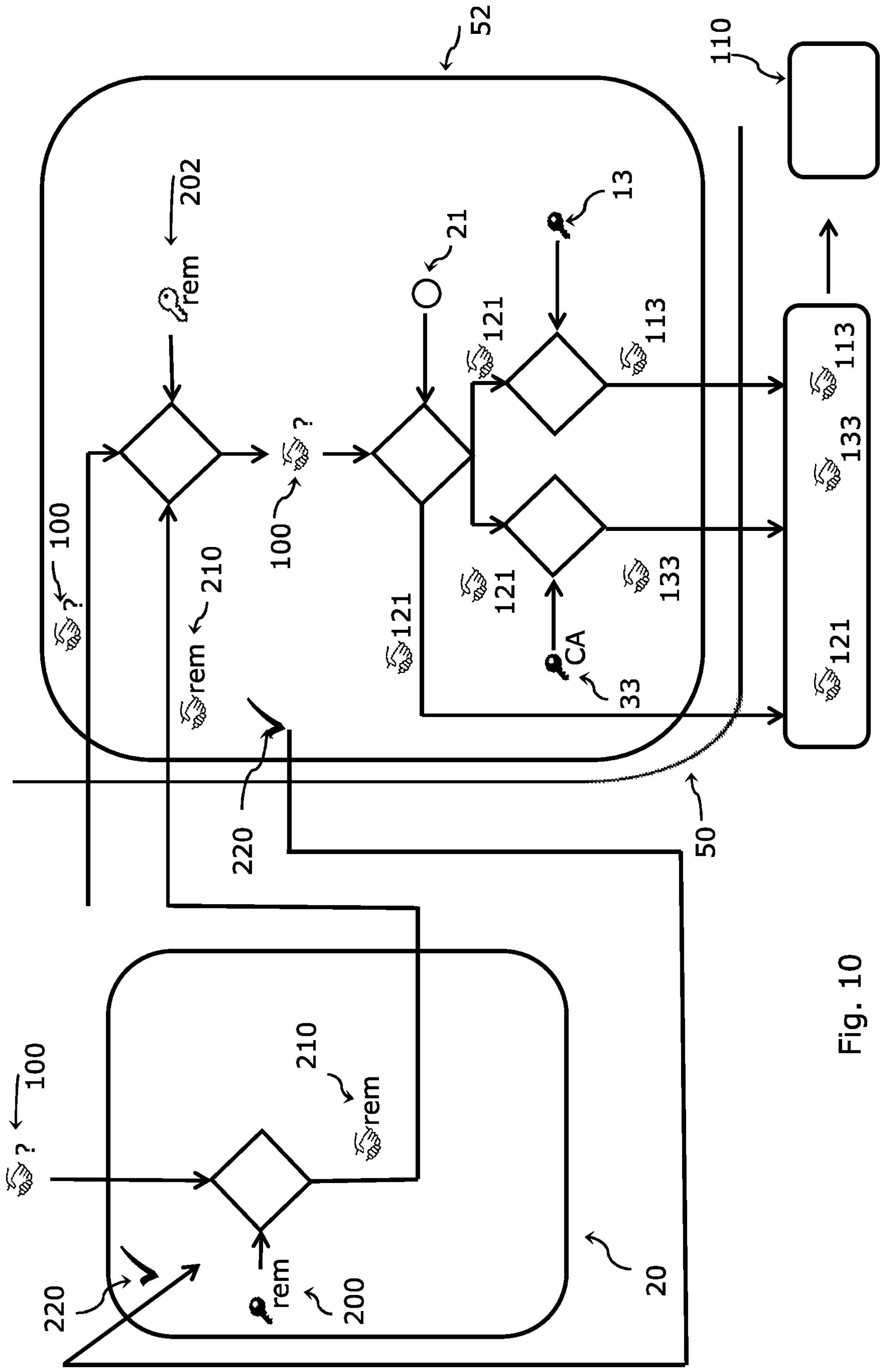
FIG. 10 depicts a further signing procedure according to embodiments of the present technology.

FIGS. 9 and 10 depict signing procedures which may be performed with the data processing apparatus 50 initialized with the steps depicted in FIG. 8.

More particularly, FIG. 10 depicts a signing procedure generally corresponding to the one discussed with reference to FIG. 4, but including additional features. It will be understood that the signing procedure depicted in FIG. 10 is based on the signing procedure of FIG. 10 with additional steps, as will be discussed below.

FIG. 8 again depicts a data processing apparatus 50, which may be the data processing apparatus discussed before, and more particularly steps of its initialization. Furthermore, FIG. 8 also depicts a remote signature system 20. The remote signature system 20 generates a remote asymmetric key pair comprising a remote private key 200 and a remote public key 202. It should be understood that the term "remote" in remote private key 200 and in remote public key 202 should not be limiting as regards the characteristics of these keys, but distinguish these keys 200, 202 from other keys used in the present specification. After the generation of these remote keys 200, 202, the remote public key 202 is sent from the remote signature system 20 to the data processing apparatus 50 and more particularly to the secure portion 52 of the data processing apparatus 50.

Furthermore, signing credentials 220 corresponding to the remote keys 200, 202 are generated and are also send, e.g., to the data processing apparatus 50. For example, the signing credentials may be stored in the secure portion 52 of the data processing apparatus 50. However, it should be understood that this is only exemplary and that the signing credentials 220 may also not be present on the data processing apparatus 50, but may, e.g., be stored elsewhere.

In FIG. 8, it is depicted that the signing credentials 220 and the remote public key 202 are sent to the data processing apparatus 50 individually. However, it should be understood that this is merely exemplary and that the signing credentials 220 and the remote public key 202 can also be sent simultaneously. Furthermore, as it will be understood that the steps described with reference to FIG. 8 also relate to the initialization, it should also be understood that the signing credentials 220 and the remote public key 202 can also be sent simultaneously with the wrapped private certificate key 40 (if the initialization of FIG. 2*a* and/or 2*b* is used).

When later providing the signing credentials 220 to the remote signature system 20, the remote signature system 20 will sign a provided data structure, e.g., a transaction request.

It should be understood that the steps depicted in FIG. 8 may be performed in addition to the steps discussed in connection to FIGS. 2*a*/2*b* and 3 (e.g., either before the steps of FIGS. 2*a*/2*b* and 3, simultaneously, or after), however, they may also be performed independently therefrom. If the steps of FIG. 8 are performed in addition to the steps discussed in connection to FIGS. 2*a*/2*b* and 3, the data processing apparatus 50 having undergone the combined initialization process comprises the digital system certificate 36 and the remote public key 202, and (in the secure portion 52) the unwrapped private certificate key 33, the seed 21, and the signing credentials 220.

A further embodiment for generating a signature is depicted in FIG. 9. It will be understood that some steps of the embodiment depicted in FIG. 9 correspond to the steps depicted in FIG. 4 and that corresponding reference signs are used in FIGS. 4 and 9.

More particularly, FIG. 9 depicts a signature generation for a data processing apparatus 50 initialized with an initialization procedure comprising the steps discussed in conjunction with FIG. 8.

The data processing apparatus 50 thus has a secure portion 52 and a remote public key 202 is stored in the secure portion 52. Furthermore, signing credentials 220 are used in the signature generation depicted in FIG. 9. The signing credentials 220 may, for example, be stored in the secure portion 52 of the data processing apparatus 50. However, it should be understood that this is optional.

As depicted in FIG. 9, the signature procedure uses a signing request 100. The signing request 100 is provided to the remote signature system 20. Furthermore, the signing credentials 220 are provided to the remote signature system 20. In the depicted embodiment, the signing credentials 220 are provided from the secure portion 52 of the data processing apparatus 50 to the remote signature system 20. However, it should be understood that this is merely exemplary and that the signing credentials 220 may also be provided in a different manner to the remote signature system 20.

The remote signature system 20 comprises a remote private key 200. It should be understood that the term "remote" in remote private key 200 should not be limiting as regards the characteristics of this private key 200, but distinguish this private key 200 from other private keys used in the present specification.

After receiving the correct signing credentials 220, the remote signature system 20 generates a pre-signature 210 based on the signing request 100 and the remote private key 200, to thus generate a pre-signature 210, which is the signing request signed by the remote private key 200. It will thus be understood that the generation of the pre-signature 210 depends on receipt of the correct signing credentials 220.

The signing credentials 220 thus indicate that the remote signature system 20 should provide the pre-signature 210.

In the depicted embodiment, the signing credentials 220 are provided from the data processing apparatus 50 to the remote signature system 20. More particularly, the signing credentials 220 are stored in the secure portion 52 of the data processing apparatus 50. However, it should be understood that this is merely exemplary and that it is also possible that the signing credentials 220 are stored, e.g., on another device and are provided from such other device to the remote signature system 20.

The pre-signature 210 is sent to the data processing apparatus 50 and more particularly to the secure portion 52 of the data processing apparatus 50. Furthermore, also the signing request 100 is provided to the secure portion 52 of the data processing apparatus. For example, the signing request 100 may be sent from the remote signature system 10 to the secure portion 52 of the data processing apparatus 50. However, it should be understood that this is merely exemplary and that the signing request 100 can also be provided to the secure portion 52 of the data processing apparatus 50 in a different manner.

The secure portion 52 of the data processing apparatus 50 comprises the remote public key 202 corresponding to the remote private key 200. By means of the remote public key 202, the data processing apparatus 50 determines whether the pre-signature 210 is valid, i.e., whether the signing request 100 has been signed by the remote private key 200.

If this is the case, at least one signature 250 is generated based on the signing request 100 and a signature routine. For example, at least one signature key and/or seed, together indicated by reference number 260 may be used to generate at least one signature 250 in the secure portion 52. The at least one signature 250 may be broadcast and may be provided, e.g., to a blockchain node 110 to cause a blockchain transaction. However, it should be understood that the present technology is not limited to blockchain implementations, but may also be used in conjunction, e.g., with smart contracts, time stamping, or compliance data.

The embodiments described in conjunction with FIGS. 8 and 9 thus allow for a different key management. By means of the embodiment described in conjunction with FIGS. 8 and 9, also the remote signature system 20 is used for signing.

Thus, the remote signature system 20 can be used to lock the signing functionality of the data processing apparatus 50, e.g., in case the data processing apparatus 50 is lost. Put differently, access to the remote signature system 20 may be suppressed, or usage of the remote key pair 200, 210, to thus securely lock the functionality of the data processing apparatus 50. It will be understood that this allows for a temporary or permanent locking of the functionality of the data processing apparatus 50.

For example, in case a data processing apparatus 50 initialized in the above manner was lost, the respective remote key pair 200, 210 can be suppressed at the remote signature system 20. Thus, the data processing apparatus 50 could no longer be used.

Furthermore, a new data processing apparatus 50 could be set up and initialized in the same manner (and in particular with the same seed 21), but with a new remote key pair 200, 210. Thus, a corresponding data processing apparatus 50 could be set up and initialized.

Overall, this embodiment thus allows the data processing apparatus 50 to be remotely activated, deactivated, e.g., temporarily blocked or definitely blocked, and replaced without the need for to replace the seed.

FIG. 10 depicts an embodiment of a signature generation generally corresponding to the one depicts in FIG. 9. However, in this embodiment, more details of the signature routine are depicted.

That is, the embodiment in FIG. 10 is one possible realization of the embodiment discussed in FIG. 9, where more details of the signature routine are discussed.

In particular, it will be understood that the process depicted in FIG. 10 is identical to the process depicted in FIG. 9 up to the point where the validity of the pre-signature 210 is determined, and reference can thus be made to the description of FIG. 9 up to this point.

If this is the case, i.e., when it is determined that the signing request 100 has been signed by the remote private key 200, the signing request 100 is subjected to a signature routine comprising the steps described previously with reference to FIG. 4.

In other words, FIG. 10 depicts a combination of the embodiments of FIG. 9 (up to the determination that the signing request 100 has been signed by the remote private key) and FIG. 4 (starting with the provision of the signing request 100 to the secure portion).

Thus, the advantages described above with reference to FIG. 4 and FIG. 9 can be combined.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, preferred embodiments have been described with reference to the accompanying drawings, the skilled person will understand that these embodiments were provided for illustrative purpose only and should by no means be construed to limit the scope of the present disclosure, which is defined by the claims.

What is claimed is:

1. A data processing apparatus comprising a secure portion, wherein the secure portion comprises:

a private key, an unencrypted private certificate key, a seed generated based on the unencrypted private certificate key, and a random number generator, and a remote public key, wherein the private key, the unencrypted private certificate key, and the seed are non-extractable from the secure portion, wherein the data processing apparatus comprises a smart card, and wherein the data processing apparatus is configured to only allow data structures signed by a key derived from the seed to be signed by the unencrypted private certificate key, and wherein the secure portion is configured to:

receive a signing request, receive a pre-signature from a remote signature system signing the signing request with a remote private key corresponding to the remote public key, generate, depending on a successful verification that the pre-signature is the signing request signed with the remote private key with the remote public key, a signature signed with a private key derived from the seed and signing the signature with the unencrypted private certificate key and thus generating a signature signed with the unencrypted private certificate key, and output, depending on the successful verification that the pre-signature is the signing request signed with the remote private key with the remote public key, the signature signed with the private key derived from the seed and the signature signed with the unencrypted private certificate key.

2. The data processing apparatus according to claim 1, wherein the data processing apparatus further comprises a signed digital certificate.

3. The data processing apparatus according to claim 1, wherein the data processing apparatus further comprises a serial number generated by the random number generator.

4. The data processing apparatus according to claim 1, wherein the smart card has near field communication functionality.

5. The data processing apparatus according to claim 1, wherein the data processing apparatus further comprises a signed digital system certificate, wherein the signed digital system certificate is signed with a public certificate key corresponding to the private certificate key, and wherein the signed digital system certificate is based on personal user data, the signed digital certificate and the public certificate key.

6. The data processing apparatus according to claim 1, wherein the data processing apparatus is obtainable by a method, wherein the method comprises:

providing a data processing apparatus, wherein the data processing apparatus comprises the secure portion, wherein the secure portion comprises the private key that cannot be extracted from the secure portion, wherein the secure portion comprises a public key corresponding to the private key, the data processing apparatus providing a signing request, the public key, and a serial number, based on the signing request, the public key, and the signing request, an external data processing apparatus generating a signed digital certificate, providing the signed digital certificate to the data processing apparatus, providing the signed digital certificate to a data processing system, the data processing system receiving personal user data from a user, providing a public certificate key to the data processing system, the data processing system generating a signed digital system certificate signed with the public certificate key based on the personal user data, the signed digital certificate, and the public certificate key, providing the signed digital system certificate to the data processing apparatus, generating the public certificate key and the corresponding private certificate key, encrypting the private certificate key with the public key and thus generating a wrapped key, providing the wrapped key to the secure portion of the data processing apparatus, in the secure portion, unencrypting the wrapped key with the private key and thus obtaining the private certificate key, and in the secure portion, generating the seed based on the private certificate key.

7. The data processing apparatus according to claim 1, wherein the data processing apparatus is configured to only allow data structures signed by a key derived from seed to be signed by the private key.

8. A method, wherein the method uses a data processing apparatus comprising a secure portion, wherein the secure portion comprises:

a private key, an unencrypted private certificate key, a seed generated based on the unencrypted private certificate key, and a random number generator, and a remote public key, wherein the private key, the unencrypted private certificate key, and the seed are non-extractable from the secure portion, wherein the data processing apparatus is a smart card, and wherein the data processing apparatus is configured to only allow data structures signed by a key derived from seed to be signed by the unencrypted private certificate key, the method comprising:

the secure portion receiving a signing request, a remote signature system receiving the signing request, the remote signature system signing the signing request with a remote private key corresponding to the remote public key and thus generating a pre-signature, the secure portion receiving the pre-signature, in the secure portion, generating, depending on a successful verification that the pre-signature is the signing request signed with the remote private key with the remote public key, a signature signed with a private key derived from the seed and signing the signature with the unencrypted private certificate key and thus generating a signature signed with the unencrypted private certificate key, and outputting, depending on the successful verification that the pre-signature is the signing request signed with the remote private key with the remote public key, the signature signed with the private key derived from the seed and the signature signed with the unencrypted private certificate key.

9. The method according to claim 8, wherein the method further comprises:

in the secure portion, signing the signature with the private key and thus generating a signature signed with the private key, and outputting the signature signed with the private key together with the signature signed with the private key derived from the seed and the signature signed with the unencrypted private certificate key.

10. The method according to claim 8, wherein the apparatus further comprises a signed digital certificate, and wherein the method further comprises outputting the signed digital certificate together with the signature signed with the private key derived from the seed and the signature signed with the unencrypted private certificate key.

11. The method according to claim 8, wherein the data processing apparatus is obtainable by a method, wherein the method comprises:

providing a data processing apparatus, wherein the data processing apparatus comprises the secure portion, wherein the secure portion comprises the private key that cannot be extracted from the secure portion, wherein the secure portion comprises a public key corresponding to the private key, the data processing apparatus providing a signing request, the public key, and a serial number, based on the signing request, the public key, and the signing request, an external data processing apparatus generating a signed digital certificate, providing the signed digital certificate to the data processing apparatus, providing the signed digital certificate to a data processing system, the data processing system receiving personal user data from a user, providing a public certificate key to the data processing system, the data processing system generating a signed digital system certificate signed with the public certificate key based on the personal user data, the signed digital certificate, and the public certificate key, providing the signed digital system certificate to the data processing apparatus, generating the public certificate key and the corresponding private certificate key, encrypting the private certificate key with the public key and thus generating a wrapped key, providing the wrapped key to the secure portion of the data processing apparatus, in the secure portion, unencrypting the wrapped key with the private key and thus obtaining the private certificate key, and in the secure portion, generating the seed based on the private certificate key, and wherein the method further comprises outputting the signed digital system certificate together with the signature signed with the private key derived from the seed and the signature signed with the unencrypted private certificate key.

* * * * *